United States Patent
Zhu

(10) Patent No.: US 8,320,564 B2
(45) Date of Patent: Nov. 27, 2012

(54) ENCRYPTED SIGNAL DETECTION CIRCUIT AND VIDEO DEVICE USING THE SAME

(75) Inventor: Gui-Dong Zhu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 461 days.

(21) Appl. No.: 12/760,531

(22) Filed: Apr. 14, 2010

(65) Prior Publication Data

US 2011/0194689 A1    Aug. 11, 2011

(51) Int. Cl.
*H04N 7/167* (2011.01)
(52) U.S. Cl. .................................................. 380/222
(58) Field of Classification Search .............. 380/221, 380/222, 204–206, 235, 238
See application file for complete search history.

(56) References Cited

U.S. PATENT DOCUMENTS

| | | | |
|---|---|---|---|
| 4,667,232 A * | 5/1987 | Long | 380/225 |
| 4,815,129 A * | 3/1989 | Griffin et al. | 380/222 |
| 4,893,339 A * | 1/1990 | Bright et al. | 380/28 |
| 7,072,469 B1 * | 7/2006 | Oudaltsov et al. | 380/46 |
| 2005/0141716 A1 * | 6/2005 | Kumar et al. | 380/255 |
| 2008/0279371 A1 * | 11/2008 | Lee et al. | 380/42 |
| 2010/0067685 A1 * | 3/2010 | Okita | 380/28 |
| 2012/0050266 A1 * | 3/2012 | MacNaughton et al. | 345/419 |

* cited by examiner

*Primary Examiner* — Beemnet Dada
(74) *Attorney, Agent, or Firm* — Altis Law Group, Inc.

(57) ABSTRACT

A video device includes a video signal generation circuit, an encrypted signal detection circuit and a central processing unit (CPU). The encrypted signal detection circuit detects encrypted messages in video signals output from the video signal generation circuit and outputs stable trigger control signals to the CPU, which includes an amplifier circuit, a separation circuit, a reverse circuit, a delay circuit and a trigger circuit. The video signals are amplified via the amplifier circuit and negative phase pulse signals are extracted from the video signals via the separation circuit. The reverse circuit converts the negative phase pulse signals to positive phase pulse signals that are delayed via the delay circuit. The trigger circuit outputs the stable trigger control signals based on the delayed positive phase pulse circuit.

16 Claims, 7 Drawing Sheets

ENCRYPTED SIGNAL DETECTION CIRCUIT AND VIDEO DEVICE USING THE SAME

BACKGROUND

1. Technical Field

The present disclosure relates to a video device, and especially related to an encrypted signal detection circuit used in a video device.

2. Description of Related Art

As consciousness of intellectual property right protection grows, efforts to stem piracy of media files, such as audio/video files, is widespread. To protect rights and interests of copyright owners and also prevent illegal copying, some media files carry encryption messages.

Commonly used video devices use integrated circuits (ICs) to detect video signals and initialize central processing units (CPUs). However, the ICs mentioned above cannot identify the video signals with the encrypted messages precisely, which can lead to misoperation.

DETAILED DESCRIPTION

Figure 1:
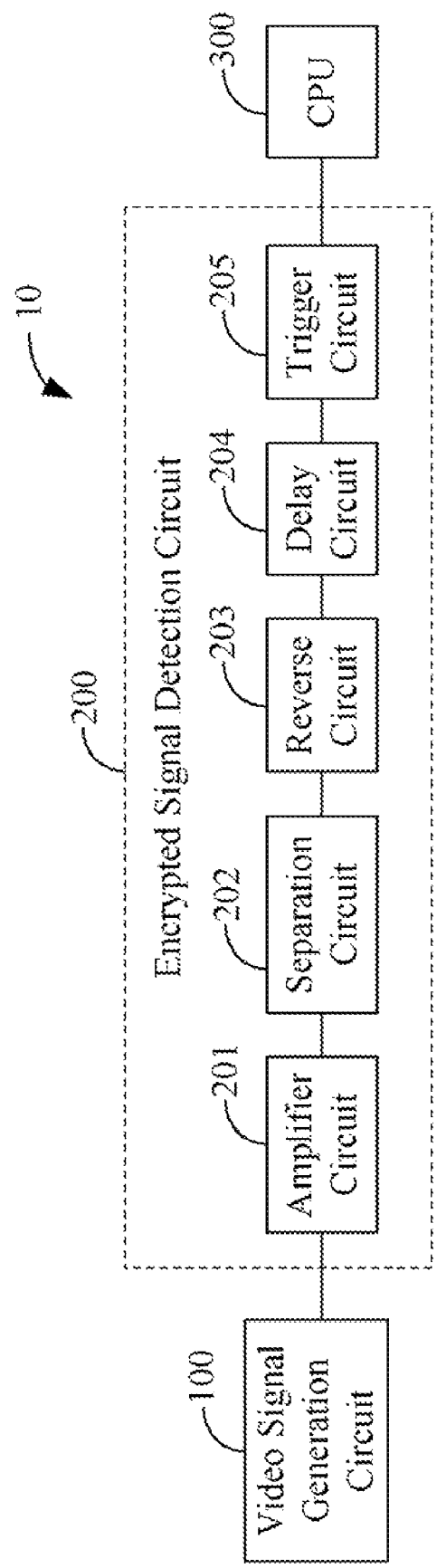
FIG. 1 is a block diagram of one embodiment of a video device of the present disclosure.

FIG. 1 is a block diagram of one embodiment of a video device 10 (such as set top box) of the present disclosure. The video device 10 comprises a video signal generation circuit 100, an encrypted signal detection circuit 200 and a central processing unit (CPU) 300. The video signal generation circuit 100 generates video signals with encrypted messages that are detected and analyzed by the encrypted signal detection circuit 200.

Figure 3:
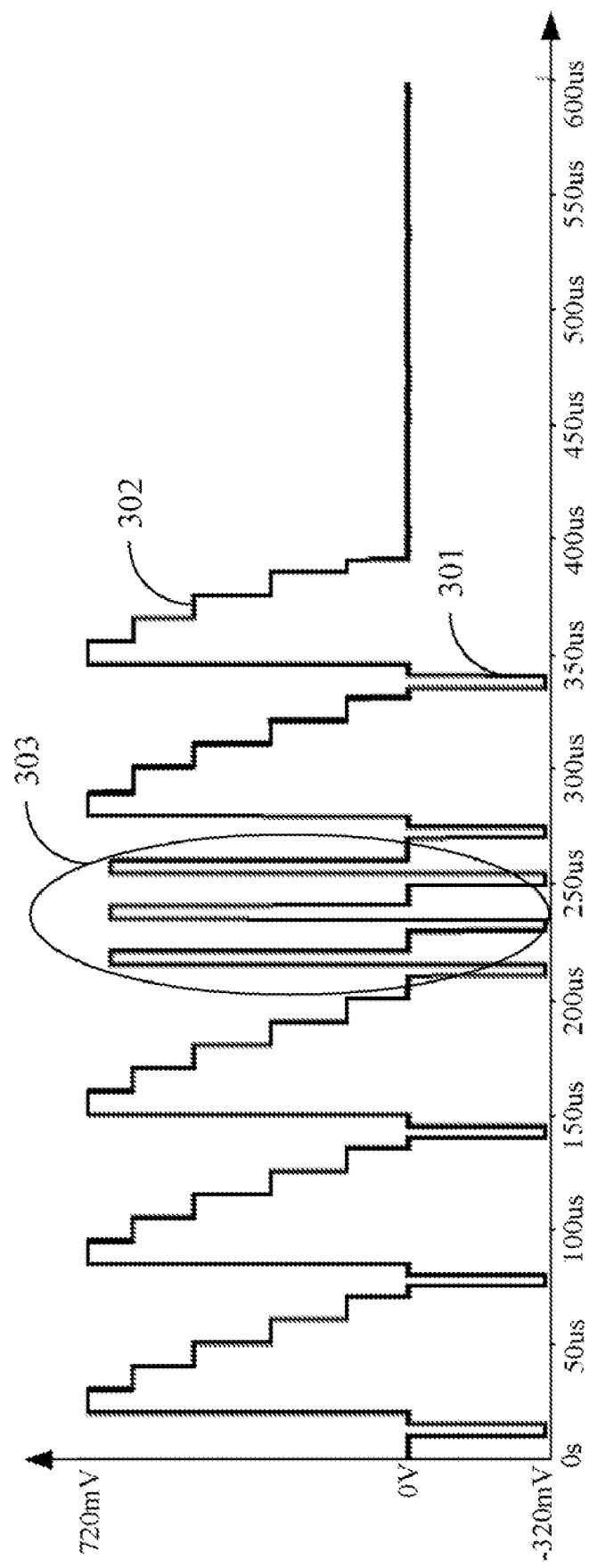
FIG. 3~FIG. 7 are wave diagrams of the encrypted signal detection circuit of FIG. 2.

In one embodiment, as shown in FIG. 3, video signals output from the video signal generation circuit 100, comprise negative phase synchronization pulse signals 301, positive phase video data signals 302, and encrypted signals 303. The encrypted messages mentioned above are carried in the encrypted signals 303 divided into positive phase encrypted signals and negative phase encrypted signals. In the present disclosure, the encrypted signals 303 can be added between the video data signals 302 at random to protect illegal users from copying. Normally, in order to synchronize the video data signals 302, one negative phase synchronization pulse signal 301 should be added before each video data signal 302. Also referring to FIG. 3, waveforms of the negative phase encrypted signals and the negative phase synchronization pulse signals 301 are substantially the same, differing in frequency, with frequency of the negative phase encrypted signals exceeding that of the negative phase synchronization pulse signals 301.

In one embodiment, the encrypted signal detection circuit 200 comprises an amplifier circuit 201, a separation circuit 202, a reverse circuit 203, a delay circuit 204 and a trigger circuit 205. The amplifier circuit 201 amplifies the video signals output from the video signal generation circuit 100. The separation circuit 202 extracts negative phase pulse signals from the amplified video signals. The negative phase pulse signals comprise the negative phase synchronization pulse signals 301 and the negative phase encrypted signals.

Figure 4:
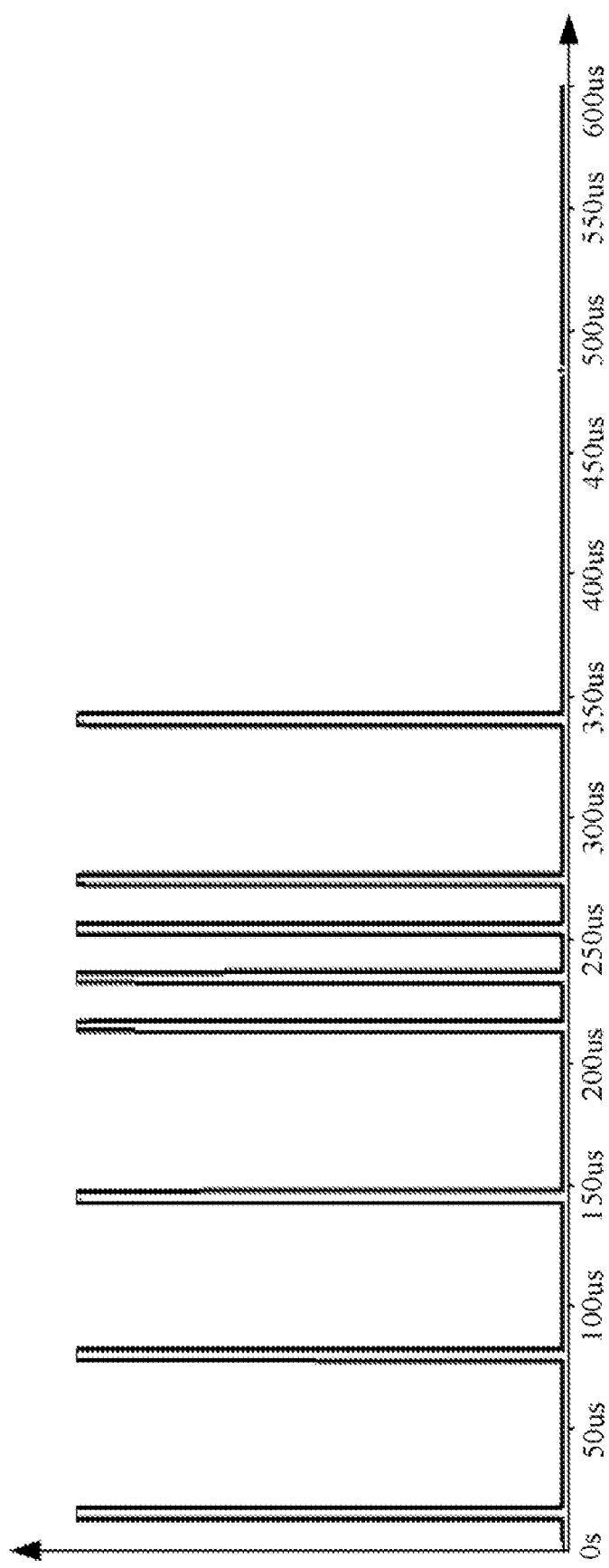
Figure 5:
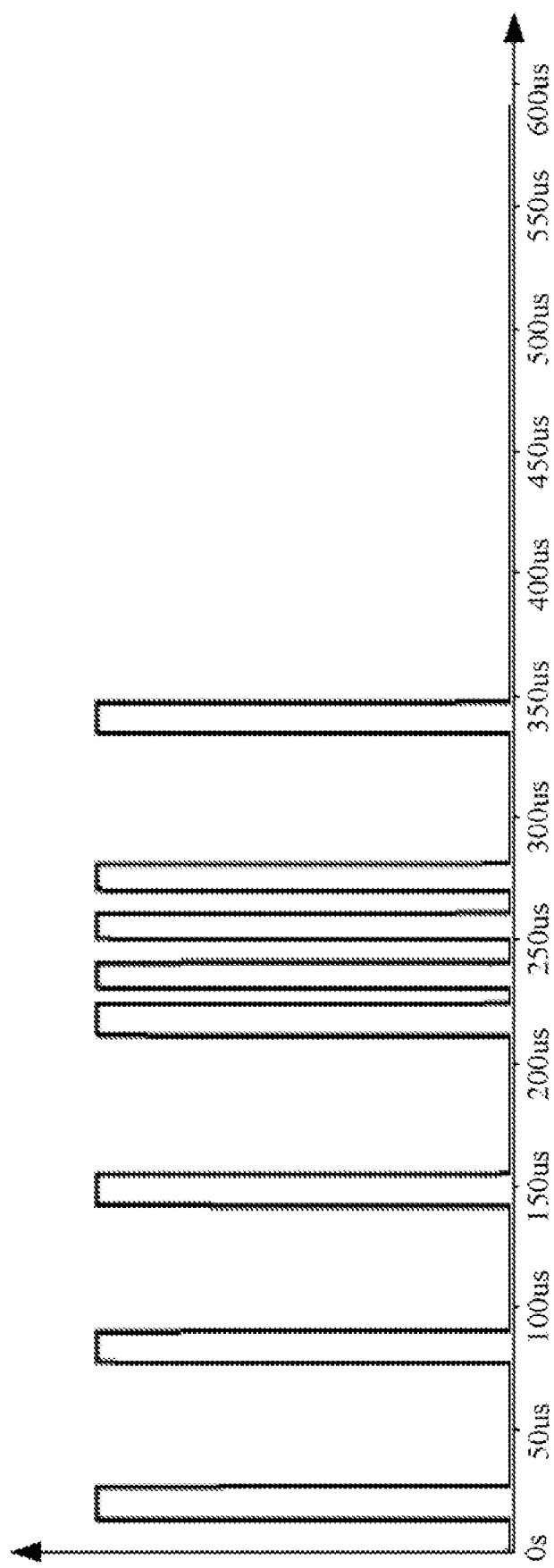
Figure 7:
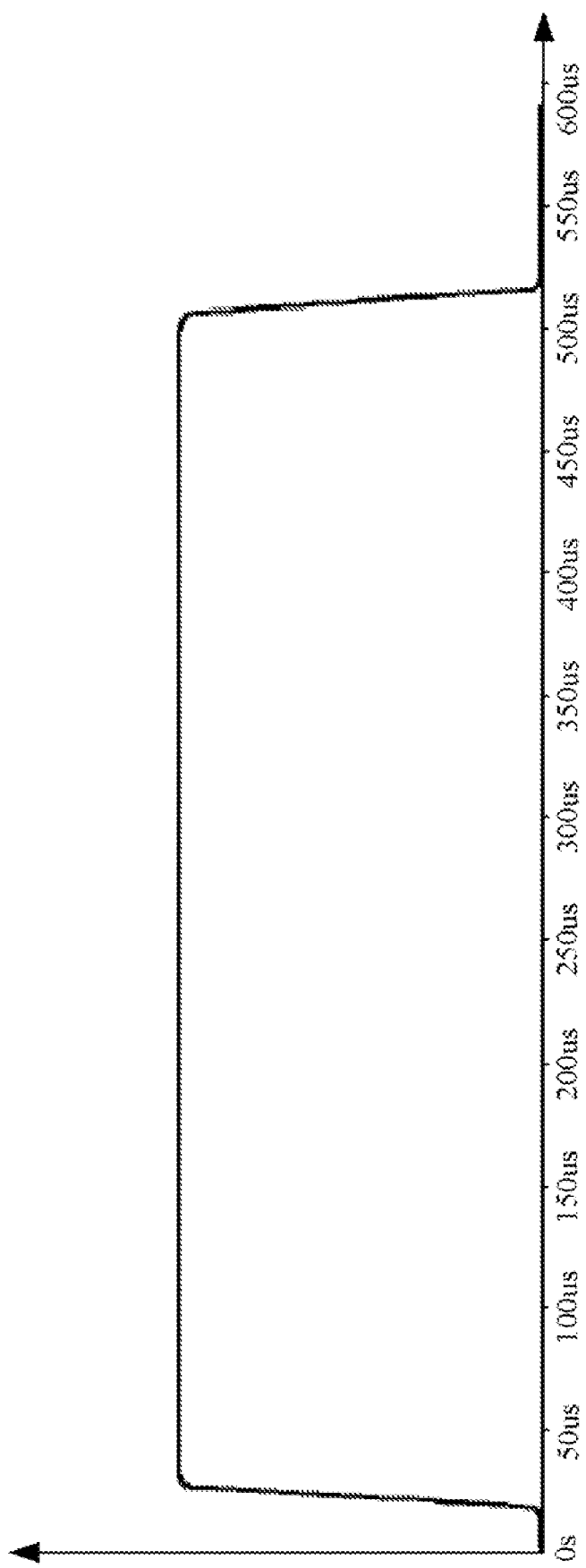

The reverse circuit 203 reverses the extracted negative phase pulse signals and outputs positive phase pulse signals as shown in FIG. 4. The delay circuit 204 delays duty cycles of the positive phase pulse signals and outputs the delayed positive phase pulse signals as shown in FIG. 5. The trigger circuit 205 outputs the stable trigger control signals based on the delayed positive phase pulse signals as shown in FIG. 7.

Figure 2:
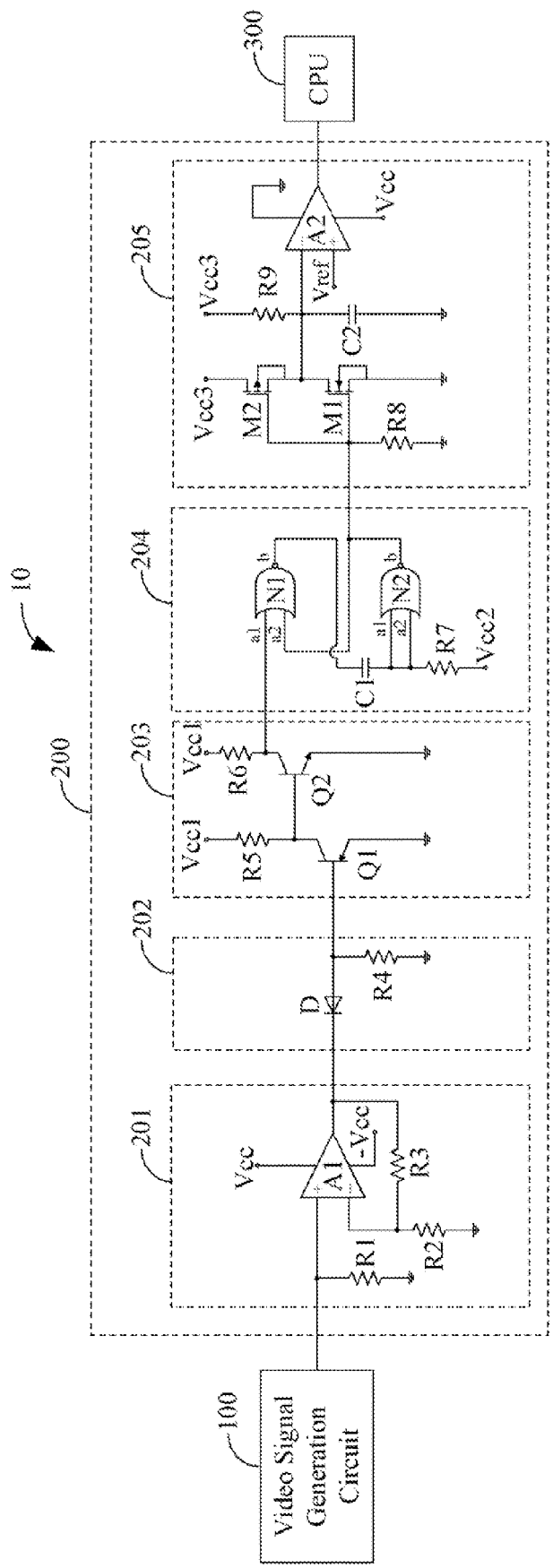
FIG. 2 is a detailed circuit diagram of one embodiment of an encrypted signal detection circuit as disclosed.

FIG. 2 is a detailed circuit diagram of the encrypted signal detection circuit 200 of FIG. 1 of the present disclosure. The amplifier circuit 201 comprises an amplifier A1 and a plurality of resistors R1, R2, R3. The amplifier A1 has a positive input connected to the video signal generation circuit 100 to receive the video signals and also grounded via the resistor R1, a negative input grounded via the resistor R2, and an output to output the amplified video signals. The resistor R3 is connected between the negative input and the output of the amplifier A1, which determines an amplification coefficient with the resistor R2. The amplification coefficient of the amplifier circuit 201 is about 4, which can be adjusted based on actual requirements in alternative embodiments.

The separation circuit 202 comprises a diode D and a resistor R4. The diode D has a cathode connected to the output of the amplifier A1 to receive the amplified video signals, and an anode grounded via the resistor R4 to output the extracted negative phase pulse signals.

The reverse circuit 203 comprises a first transistor Q1, a second transistor Q2 and resistor R5, R6. Each of the first and the second transistors has a base terminal, a collector terminal and an emitter terminal. The base terminal of the first transistor Q1 is connected to the anode of the diode D to receive the extracted negative phase pulse signals, the collector terminal thereof is connected to a first external power source Vcc1 via the resistor R5, and the emitter terminal thereof is grounded. The base terminal of the second transistor Q2 is connected to the collector terminal of the first transistor Q1, the collector terminal thereof is also connected to the first external power source Vcc1 via the resistor R6 and outputs the positive phase pulse signals, and the emitter terminal thereof is grounded. In one embodiment, the first transistor Q1 is a pnp type bipolar junction transistor (BJT), and the second transistor Q2 is a npn type BJT. In addition, the first external power source Vcc1 is about 5V.

The delay circuit 204 comprises a first logic component N1, a second logic component N2, a capacitor C1 and a resistor R7. Both the first and the second logic components have a first input terminal a1, a second input terminal a2 and an output terminal b. The first input terminal a1 of the first logic component N1 is connected to the collector terminal of the second transistor Q2 to receive the positive phase pulse signals. The first input terminal a1 and the second input terminal a2 of the second logic component N2 are connected together, and all are connected to the output terminal b of the first logic component N1 via the capacitor C1. The output terminal b of the second logic component N2 is connected to the second input terminal a2 of the first logic component N1 to output the delayed positive phase pulse signals. The resistor R7 is connected between the second input terminal a2 of the second logic component N2 and a second external power source Vcc2, which determines a delay time of the delay circuit 204 with the capacitor C1. In one embodiment, the first and the second logic components N1, N2 are NOR gates, and the second external power source Vcc2 is about 5V.

The trigger circuit 205 comprises a third transistor M1, a fourth transistor M2, a capacitor C2, a comparator A2 and resistors R8, R9. Both the third transistor M1 and the fourth transistor M2 have a gate terminal, a source terminal and a drain terminal. The gate terminal of the third transistor M1 and the fourth transistor M2 are all connected to the output terminal b of the second logic component N2 to receive the delayed positive phase signals and also grounded via the resistor R8. The source terminal of the third transistor M1 is directly grounded, and the drain terminal thereof is connected to the drain terminal of the fourth transistor M2. The source terminal of the fourth transistor M2 is connected to a third external power source Vcc3. The resistor R9 and the capacitor C2 are connected between the third external power source Vcc3 and ground in series, a common junction of which is connected to the drain terminal of the third transistor M1. The comparator A2 has a positive input to receive a reference voltage, a negative input connected to the common junction of the resistor R9 and the capacitor C2, and an output connected to the CPU 300 to output the stable trigger control signals. In one embodiment, the third transistor M1 is an N type metallic oxide semiconductor field effecttransistor (MOSFET), and the fourth transistor M2 is a P type MOSFET. In addition, the third external power source Vcc3 is about 3.3V.

Also referring to FIG. 3~FIG. 7, the amplifier A1 of the amplifier circuit 201 amplifies the video signals output from the video signal generation circuit 100, and the amplified video signals are output to the diode D of the separation circuit 202. Thus, the negative phase pulse signals are extracted. In the reverse circuit 203, when the base terminal of the first transistor Q1 receives a low logic level, the first transistor Q1 is on and the second transistor Q2 is off. Thus, the collector terminal of the second transistor Q2 outputs a high logic level. Otherwise, when the base terminal of the first transistor Q1 receives a high logic level, the first transistor Q1 is off and the second transistor Q2 is on. Thus, the collector terminal of the second transistor Q2 outputs a low logic level. Therefore, the extracted negative phase pulse signals are converted into the positive phase pulse signals via the reverse circuit 203.

In the delay circuit 204, when the video device 10 is powered on instantaneously, the capacitor C1 is quickly fully charged. Accordingly, the first input terminal a1 and the second input terminal a2 of the second logic component N2 receive a high logic level, thus, the output terminal b thereof outputs a low logic level. Correspondingly, the second input terminal a2 of the first logic component N1 receives the low logic level.

When the positive phase pulse signals are changed from the low logic level to the high logic level, the first input terminal a1 of the first logic component N1 receives the high logic level, accordingly, the output terminal b outputs a low logic level. Thus, the capacitor C1 is turned on substantially. Both the first input terminal a1 and the second input terminal a2 of the second logic component N2 receive the low logic level, and the output terminal b thereof output a high logic level. Accordingly, the second input terminal a2 of the first logic component N1 receive the high logic level and the output terminal b thereof also output the low logic level, which directs the delay circuit 204 to maintain a dynamic balance state. When the capacitor C1 is turned off, the capacitor C1 is charged by the second external power source Vcc2. During a period of time, the capacitor C1 is saturated, the first input terminal a1 and the second input terminal a2 of the second logic component N2 receive the high logic level and the output terminal b thereof outputs the low logic level. Therefore, the delay circuit 204 can delay the high logic levels of the positive phase pulse signals, increasing the duty cycle of the positive phase pulse signals.

When the positive phase pulse signals are changed from the high logic level to the low logic level, the first input terminal a1 of the first logic component N1 receives the low logic level and the output terminal b thereof outputs a high logic level. Thus, the capacitor C1 is not turned on, accordingly, both the first input terminal a1 and the second terminal a2 of the second logic component N2 maintain the high logic level and the output terminal b thereof outputs the low logic level. Similarly, the second input terminal a2 of the first logic component N1 also receives the low logic level and the output terminal b thereof also outputs the high logic level. Specifically, the dynamic balance state can be changed when another high logic level of the positive phase pulse signals is output to the first input terminal a1 of the first logic component N1. Thus, it can be seen that the duty cycle of the positive phase pulse signals is delayed while maintaining an original period.

Figure 6:
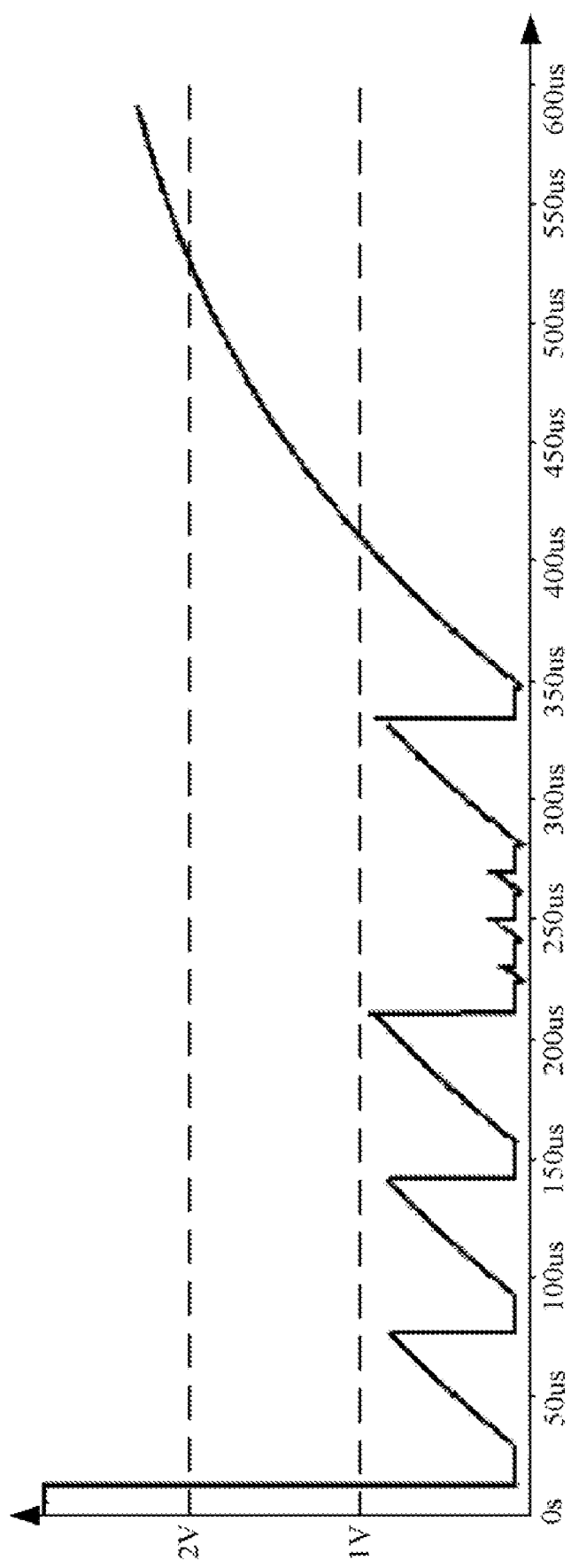

In the trigger circuit 205, when the high logic levels of the positive phase pulse signals are output to the base terminal of the third transistor M1, the third transistor M1 is on and the fourth transistor M2 is off. Thus, the capacitor C2 discharges via the third transistor M1 instantaneously. The negative input of the comparator A2 receives a low logic level, such as 0V. Because the reference voltage received by the positive input of the comparator A2 is about 2V, the comparator A2 outputs the high logic level as shown in FIG. 7. When the positive phase pulse signals are converted from the high logic level to the low logic level, the third transistor M1 is off and the fourth transistor M2 is on. Thus, the capacitor C2 is charged by the third external power source Vcc3, which determines a charge time with the resistor R9. In one embodiment, saturation voltage of the capacitor C2 is related with the frequency of the positive phase pulse signals. Seen from FIG. 4 and FIG. 5, the frequency of the negative phase encrypted signals exceeding that of the negative phase synchronization pulse signals 301, accordingly, the saturation voltage of the capacitor C2 corresponding to the negative phase encrypted signals is lower than that of the negative phase synchronization pulse signals 301. Referring to FIG. 6, the saturation voltage of the capacitor C2 corresponding to the negative phase encrypted signals is about 1V, lower than the reference voltage received from the positive phase input terminal of the comparator A2. Thus, the comparator A2 also outputs the high logic level as shown in FIG. 7. Until no signals are output from the video device 10, the trigger circuit 205 can output the trigger control signals of the low logic level. Therefore, the frequency of the negative phase synchronization pulse signals 301 need only be sufficient to match the saturation voltage of the capacitor C2 designed frequency lower than the reference voltage. Consequently, the trigger circuit 205 can output the stable trigger control signal to the CPU 300.

In the present disclosure, the video device 10 utilizes the encrypted signal detection circuit 200 to detect the encrypted messages of the video signals and convert the video signals to the stable trigger control signals. Video device 10 can thus identify the video signals precisely with no malfunction.

Although the features and elements of the present disclosure are described in various inventive embodiment in particular combinations, each feature or element can be configured alone or in various within the principles of the present disclosure to the full extent indicated by the broad general meaning of the terms in which the appended claims are expressed.

What is claimed is:

1. An encrypted signal detection circuit to detect encrypted messages in video signals and output stable trigger control signals, the encrypted signal detection circuit comprising:
   an amplifier circuit to amplify the video signals;
   wherein the video signals are divided into positive phase video data signals, negative phase synchronization pulse signals, and encrypted signals, and the encrypted messages are carried in the encrypted signals
a separation circuit to extract negative phase pulse signals from the amplified video signals, wherein the negative phase pulse signals comprise negative phase encrypted signals and the negative phase synchronization pulse signals;
a reverse circuit to reverse the extracted negative phase pulse signals and output positive phase pulse signals;
a delay circuit to delay duty cycles of the positive phase pulse signals and output the delayed positive phase pulse signals; and
a trigger circuit to output stable trigger control signals based on the delayed positive phase pulse signals;
wherein the amplifier circuit comprises:
an amplifier comprising a positive input to receive the video signals, a negative input grounded via a first resistor, and an output to output the amplified video signals;
a second resistor connected between the negative input and output of the amplifier;
wherein the first and the second resistors are arranged to detect an amplification coefficient of the amplifier circuit.

2. The encrypted signal detection circuit as claimed in claim 1, wherein the separation circuit comprises a diode with a cathode connected to the amplifier circuit, and an anode grounded via a third resistor and also outputting the extracted negative phase pulse signals.

3. The encrypted signal detection circuit as claimed in claim 1, wherein the reverse circuit comprises:
a first transistor with a base terminal to receive the extracted negative phase pulse signals output from the separation circuit, an emitter terminal grounded and a collector terminal connected to a first external power source via a fourth resistor; and
a second transistor with a base terminal connected to the collector terminal of the first transistor, an emitter terminal grounded, and a collector terminal connected to the first external power source via a fifth resistor and also outputting the positive phase pulse signals.

4. The encrypted signal detection circuit as claimed in claim 3, wherein the first transistor is a pnp type bipolar junction transistor (BJT), the second transistor is a npn type BJT.

5. The encrypted signal detection circuit as claimed in claim 1, wherein the delay circuit comprises:
a first logic component comprising a first input terminal to receive the positive phase pulse signals output from the reverse circuit;
a second logic component comprising a first input terminal connected to an output terminal of the first logic component, a second input terminal connected to the first input terminal of the second logic component, and an output terminal connected to the second input terminal of the first logic component and also outputting the delayed positive phase pulse signals;
a first capacitor connected between the output terminal of the first logic component and the first input terminal of the second logic component, to be charged when the first input terminal of the first logic component receives the positive phase pulse signals; and
a sixth resistor connected between the second input terminal of the second logic component and ground, to detect a delay time of the delay circuit with the first capacitor.

6. The encrypted signal detection circuit as claimed in claim 5, wherein both the first and the second logic components are NOR gates.

7. The encrypted signal detection circuit as claimed in claim 1, wherein the trigger circuit comprises:
a third transistor comprising a base terminal to receive the positive phase pulse signals with increased duty cycles and a source terminal connected to a second external power source;
a fourth transistor comprising a base terminal connected to the base terminal of the third transistor, a source terminal grounded and a drain terminal connected to the drain terminal of the third transistor;
a seventh resistor;
a second capacitor connected to the seventh resistor in series between the second external power source and ground, wherein a common junction of the seventh resistor and the second capacitor is connected to the drain terminals of the third and the fourth transistors; and
a comparator with a negative phase input connected to the common junction, a positive phase input to receive a reference voltage, and an output to output the stable trigger signals.

8. The encrypted signal detection circuit as claimed in claim 7, wherein the third transistor is an N type metallic oxide semiconductor field effecttransistor (MOSFET), the fourth transistor is a P type MOSFET.

9. An electronic device comprising:
a video signal generation circuit to generate video signals, wherein the video signals are divided into positive phase video data signals, negative phase synchronization pulse signals and encrypted signals;
an encrypted signal detection circuit to detect encrypted messages in the video signals and output to stable trigger control signals, wherein the encrypted messages are carried into the encrypted signals, comprising:
an amplifier circuit to amplify the video signals;
a separation circuit to extract negative phase pulse signals from the amplified video signals, wherein the negative phase pulse signals comprise negative phase encrypted signals and the negative phase synchronization pulse signals;
a reverse circuit to reverse the extracted negative phase pulse signals and output positive phase pulse signals;
a delay circuit to delay duty cycles of the positive phase pulse signals and output the delayed positive phase pulse signals; and
a trigger circuit to output stable trigger control signals based on the delayed positive phase pulse signals; and
a central processing unit to operate according to the stable trigger control signals;
wherein the amplifier circuit comprises:
an amplifier comprising a positive input to receive the video signals, a negative input grounded via a first resistor, and an output to output the amplified video signals;
a second resistor connected between the negative input and output of the amplifier;
wherein the first and the second resistors are arranged to detect an amplification coefficient of the amplifier circuit.

10. The electronic device as claimed in claim 9, wherein the separation circuit comprises a diode with a cathode connected to the amplifier circuit, and an anode grounded via a third resistor and also outputting the extracted negative phase pulse signals.

11. The electronic device as claimed in claim 9, wherein the reverse circuit comprises:
a first transistor with a base terminal to receive the extracted negative phase pulse signals output from the separation circuit, an emitter terminal grounded and a collector terminal connected to a first external power source via a fourth resistor; and a second transistor with a base terminal connected to the collector terminal of the first transistor, an emitter terminal grounded, and a collector terminal connected to the first external power source via a fifth resistor and also outputting the positive phase pulse signals.

12. The electronic device as claimed in claim 11, wherein the first transistor is a pnp type bipolar junction transistor (BJT), the second transistor is a npn type BJT.

13. The electronic device as claimed in claim 9, wherein the delay circuit comprises:

a first logic component comprising a first input terminal to receive the positive phase pulse signals output from the reverse circuit;

a second logic component comprising a first input terminal connected to an output terminal of the first logic component, a second input terminal connected to the first input terminal of the second logic component, and an output terminal connected to the second input terminal of the first logic component and also outputting the delayed positive phase pulse signals;

a first capacitor connected between the output terminal of the first logic component and the first input terminal of the second logic component, to be charged when the first input terminal of the first logic component receives the positive phase pulse signals; and a sixth resistor connected between the second input terminal of the second logic component and ground, to detect a delay time of the delay circuit with the first capacitor.

14. The electronic device as claimed in claim 13, wherein both the first and the second logic components are NOR gates.

15. The electronic device as claimed in claim 9, wherein the trigger circuit comprises:

a third transistor comprising a base terminal to receive the positive phase pulse signals with increased duty cycles and a source terminal connected to a second external power source;

a fourth transistor comprising a base terminal connected to the base terminal of the third transistor, a source terminal grounded and a drain terminal connected to the drain terminal of the third transistor;

a seventh resistor;

a second capacitor connected to the seventh resistor in series between the second external power source and ground, wherein a common junction of the seventh resistor and the second capacitor is connected to the drain terminals of the third and the fourth transistors; and a comparator with a negative phase input connected to the common junction, a positive phase input to receive a reference voltage, and an output to output the stable trigger signals.

16. The electronic device as claimed in claim 15, wherein the third transistor is an N type metallic oxide semiconductor field effect transistor (MOSFET), the fourth transistor is a P type MOSFET.

* * * * *

UNITED STATES PATENT AND TRADEMARK OFFICE
CERTIFICATE OF CORRECTION

PATENT NO. : 8,320,564 B2  
APPLICATION NO. : 12/760531  
DATED : November 27, 2012  
INVENTOR(S) : Gui-Dong Zhu Page 1 of 1

It is certified that error appears in the above-identified patent and that said Letters Patent is hereby corrected as shown below:

Title Page, below Item (65) insert:

-- (30)  Foreign Application Priority Data

Feb. 5 2010  (CN) .............................2010 2 0302420 --

Signed and Sealed this  
Twenty-fourth Day of December, 2013

Margaret A. Focarino  
*Commissioner for Patents of the United States Patent and Trademark Office*